United States Patent
Kim et al.

(10) Patent No.: US 10,734,168 B2
(45) Date of Patent: Aug. 4, 2020

(54) CELLULOSE THIN FILM ELECTRODE COMPRISING SILVER NANO DENDRITE AND METHOD OF MANUFACTURING THE SAME

(71) Applicant: INDUSTRIAL COOPERATION FOUNDATION CHONBUK NATIONAL UNIVERSITY, Jeonju-si (KR)

(72) Inventors: Byoung Suhk Kim, Jeonju-si (KR); Hak Yong Kim, Jeonju-si (KR); Tae Hoon Ko, Jeonju-si (KR); Ji Young Park, Jeonju-si (KR)

(73) Assignee: INDUSTRIAL COOPERATION FOUNDATION CHONBUK NATIONAL UNIVERSITY, Jeonju-si (KR)

( * ) Notice: Subject to any disclaimer, the term of this patent is extended or adjusted under 35 U.S.C. 154(b) by 344 days.

(21) Appl. No.: 15/746,635

(22) PCT Filed: Jul. 15, 2016

(86) PCT No.: PCT/KR2016/007750
§ 371 (c)(1),
(2) Date: Jan. 22, 2018

(87) PCT Pub. No.: WO2017/039146
PCT Pub. Date: Mar. 9, 2017

(65) Prior Publication Data
US 2018/0211795 A1    Jul. 26, 2018

(30) Foreign Application Priority Data

Aug. 31, 2015  (KR) .................. 10-2015-0123046

(51) Int. Cl.
*H01G 11/86* (2013.01)
*H01G 11/36* (2013.01)
(Continued)

(52) U.S. Cl.
CPC .......... *H01G 11/86* (2013.01); *B29C 41/003* (2013.01); *B29C 41/02* (2013.01); *B29C 41/42* (2013.01);
(Continued)

(58) Field of Classification Search
CPC ................................ H01G 11/86; H01G 11/22
See application file for complete search history.

(56) References Cited

FOREIGN PATENT DOCUMENTS

| KR | 10-2000-0059156 | 10/2000 |
|---|---|---|
| KR | 10-0292317 | 11/2001 |

(Continued)

OTHER PUBLICATIONS

K. Devarayan et al., "Facile green synthesis of silver nanodendrite/cellulose acetate thin film electrodes for flexible supercapacitors", Carbohydrate Polymers, vol. 163, pp. 153-161, 2017.

*Primary Examiner* — Peter L Vajda
*Assistant Examiner* — Asha A Thomas
(74) *Attorney, Agent, or Firm* — Lex IP Meister, PLLC (57) ABSTRACT

Provided is a cellulose thin film electrode comprising a silver nano dendrite and a method of manufacturing the same. The method of manufacturing a cellulose thin film electrode comprising a silver nano dendrite comprises: forming the cellulose thin film electrode comprising a silver nano dendrite by soaking a reaction metal to which a thin film comprising silver nitrate and cellulose acetate is attached, in a reaction solution; and separating the cellulose thin film electrode from the reaction metal and then removing the reaction metal from the reaction solution.

7 Claims, 8 Drawing Sheets

(51) Int. Cl.

| | | |
|---|---|---|
| *H01G 4/28* | (2006.01) | |
| *H01G 11/68* | (2013.01) | |
| *H01G 11/70* | (2013.01) | |
| *H01G 11/30* | (2013.01) | |
| *B29C 41/00* | (2006.01) | |
| *B29C 41/02* | (2006.01) | |
| *B29C 41/42* | (2006.01) | |
| *H01G 11/34* | (2013.01) | |
| *H01G 11/48* | (2013.01) | |
| H01M 4/66 | (2006.01) | |
| B29K 1/00 | (2006.01) | |
| B29K 105/16 | (2006.01) | |
| B29K 505/14 | (2006.01) | |
| B29K 507/04 | (2006.01) | |
| B29L 31/34 | (2006.01) | |

(52) U.S. Cl.
CPC .............. *H01G 4/28* (2013.01); *H01G 11/30* (2013.01); *H01G 11/34* (2013.01); *H01G 11/36* (2013.01); *H01G 11/48* (2013.01); *H01G 11/68* (2013.01); *H01G 11/70* (2013.01); *B29K 2001/08* (2013.01); *B29K 2105/167* (2013.01); *B29K 2505/14* (2013.01); *B29K 2507/04* (2013.01); *B29L 2031/3406* (2013.01); *H01M 4/667* (2013.01)

(56) References Cited

FOREIGN PATENT DOCUMENTS

| KR | 10-2003-0034337 | 5/2003 |
|---|---|---|
| KR | 10-2009-0054379 | 5/2009 |
| KR | 10-2010-0040832 | 4/2010 |

CELLULOSE THIN FILM ELECTRODE COMPRISING SILVER NANO DENDRITE AND METHOD OF MANUFACTURING THE SAME

BACKGROUND

1. Field

The present disclosure relates to a cellulose thin film electrode comprising a silver nano dendrite and a method of manufacturing the same.

2. Description of Related Art

Recently, a demand for the development of flexible electronic components that will enable implementation of the next generation electronic apparatuses that are bendable, wearable, and implantable into human bodies has increased. However, existing energy storing apparatuses comprising a lithium ion battery and a supercapacitor are not appropriate for a flexible electronic apparatus since they are excessively rigid, heavy, and large.

In order to develop the flexible electronic apparatus, a high conductivity electrode that has high flexibility and an excellent mechanical property, is light, and has a small area is required. It has been known that studies on flexible electrodes for supercapacitors using various materials have been conducted in order to develop the high conductivity electrode as described above.

However, it is difficult to use the materials used for the conventional flexible electrodes for the flexible electronic apparatuses due to low conductivity and bad mechanical properties, a manufacturing process of the materials is complicated, and a cost required for manufacturing the materials is high.

SUMMARY

An object of the present disclosure is to provide a cellulose thin film electrode comprising a silver nano dendrite and a method of manufacturing the same.

According to an exemplary embodiment of the present disclosure, a method of manufacturing a cellulose thin film electrode comprising a silver nano dendrite comprises: forming the cellulose thin film electrode comprising a silver nano dendrite by soaking a reaction metal in a reaction solution, wherein a thin film comprising silver nitrate and cellulose acetate is attached to the reaction metal; and separating the cellulose thin film electrode from the reaction metal and then removing the reaction metal from the reaction solution.

The thin film may further comprise a multi-wall carbon nanotube (MWCNT).

The reaction solution may comprise an acid solution and an alkaline solution, a molar concentration of the acid solution or the alkaline solution may be 0.01M or more, and the reaction metal may be soaked in the reaction solution for 0.5 to 10 minutes.

The reaction metal may be soaked in the reaction solution for 0.5 to 5 minutes when the molar concentration of the reaction solution is 0.01M to 1.0M.

The reaction metal may be soaked in the reaction solution for 5 to 10 minutes when the molar concentration of the reaction solution is 1.0M or more.

The acid solution may comprise hydrochloric acid (HCl), sulfuric acid ($H_2SO_4$), and nitric acid ($HNO_3$), the alkaline solution may comprise sodium hydroxide (NaOH), potassium hydroxide (KOH), and ammonium hydroxide ($NH_4OH$), and the reaction metal may comprise aluminum (Al), magnesium (Mg), zinc (Zn), chromium (Cr), copper (Cu), tin (Sn), iron (Fe), and an alloy of two or more of the aluminum (Al), the magnesium (Mg), the zinc (Zn), the chromium (Cr), the copper (Cu), the tin (Sn), and the iron (Fe).

According to an exemplary embodiment of the present disclosure, there is provided a cellulose thin film electrode comprising a silver nano dendrite manufactured by the method of manufacturing a cellulose thin film electrode comprising a silver nano dendrite.

Other concrete contents of the present disclosure are described in a detailed description and are illustrated in the drawings.

DETAILED DESCRIPTION

Hereinafter, exemplary embodiments of the present disclosure will be described in detail with reference to the accompanying drawings so that those skilled in the art to which the present disclosure pertains may easily practice the present disclosure. However, the present disclosure may be implemented in several different forms and is not limited to exemplary embodiments described herein. In addition, in the drawings, portions unrelated to the description will be omitted to obviously describe the present disclosure, and the same or similar components will be denoted by the same reference numerals throughout the specification.

Hereinafter, the present disclosure will be described in more detail with reference to the accompanying drawings.

Figure 1:
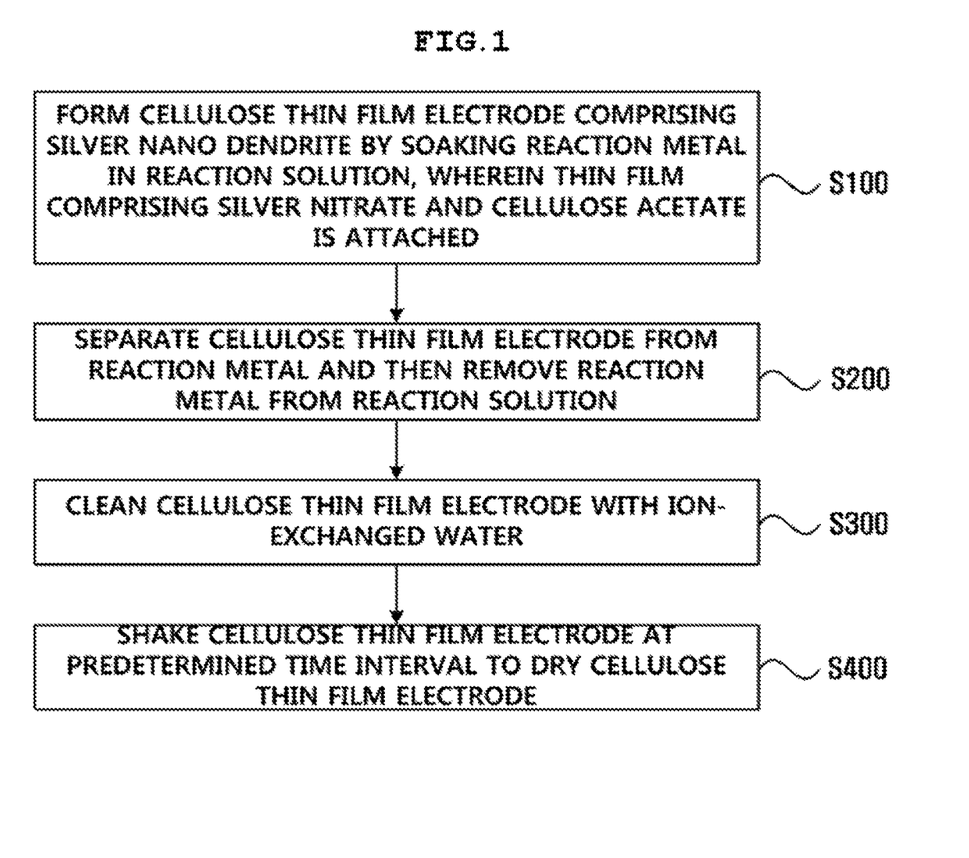
FIG. 1 is a flow chart illustrating a method of manufacturing a cellulose thin film electrode comprising a silver nano dendrite according to an exemplary embodiment of the present disclosure.

FIG. 1 is a flow chart illustrating a method of manufacturing a cellulose thin film electrode comprising a silver nano dendrite according to an exemplary embodiment of the present disclosure.

Referring to FIG. 1, the method of manufacturing a cellulose thin film electrode comprising a silver nano dendrite according to the present exemplary embodiment comprises forming the cellulose thin film electrode comprising a silver nano dendrite 10 by soaking a reaction metal in a reaction solution, wherein a thin film comprising silver nitrate and cellulose acetate is attached to the reaction metal (S100); and separating the cellulose thin film electrode from the reaction metal and then removing the reaction metal from the reaction solution (S200).

Here, the silver nitrate comprised in the thin film is reduced to silver by a galvanic reaction when the thin film is soaked in the reaction solution, such that the cellulose thin film electrode comprising the silver nano dendrite 10 may be formed.

Here, the reaction solution according to the present exemplary embodiment may comprise an acid solution and an alkaline solution.

In detail, the acid solution may comprise hydrochloric acid (HCl), sulfuric acid ($H_2SO_4$), and nitric acid ($HNO_3$), and the alkaline solution may comprise sodium hydroxide (NaOH), potassium hydroxide (KOH), and ammonium hydroxide ($NH_4OH$).

In addition, the reaction metal according to the present exemplary embodiment may comprise aluminum (Al), magnesium (Mg), zinc (Zn), chromium (Cr), copper (Cu), tin (Sn), iron (Fe), and an alloy of two or more of the aluminum (Al), the magnesium (Mg), the zinc (Zn), the chromium (Cr), the copper (Cu), the tin (Sn), and the iron (Fe).

In addition, the cellulose thin film electrode according to the present exemplary embodiment may be formed of 5.0 wt % or more of cellulose acetate and 5.0 wt % of silver nano dendrite 10.

In addition, a molar concentration of the acid solution or the alkaline solution according to the present exemplary embodiment may be 0.01M or more, and the reaction metal may be soaked in the reaction solution for 0.5 to 10 minutes.

Here, the reaction metal may be soaked in the reaction solution for 0.5 to 5 minutes when the molar concentration of the reaction solution is 0.01M to 1.0M.

In addition, the reaction metal may be soaked in the reaction solution for 5 to 10 minutes when the molar concentration of the reaction solution is 1.0M or more.

Here, when the reaction metal is soaked in the reaction solution, the reaction metal and the silver nitrate attached to the reaction metal may be reduced to the silver by a galvanic substitution reaction to form the silver nano dendrite 10.

In addition, when the reaction metal is soaked in the reaction solution, the cellulose acetate may be hydrolyzed and hydrogenated to become cellulose.

As a result, according to the present exemplary embodiment, the reaction metal to which the thin film soaked in the reaction solution is attached reacts to the reaction solution, such that the cellulose thin film electrode comprising a silver nano dendrite may be formed.

Here, when the molar concentration of the reaction solution is 0.01M to 1.0M, if the reaction metal is soaked in the reaction solution for a time shorter than 0.5 minutes, there is a problem that a substitution rate of the silver nitride by the silver nano dendrite is low due to low activity of the galvanic reaction.

In addition, when the molar concentration of the reaction solution is 0.01M to 1.0M, if the reaction metal is soaked in the reaction solution for the time shorter than 0.5 minutes, there is a problem that a hydrolysis ratio of the cellulose acetate to the cellulose is low due to a low hydrolysis reaction rate.

In addition, when the molar concentration of the reaction solution is 1.0M or more, if the reaction metal is soaked in the reaction solution for 10 minutes or more, there is a problem that the silver nano dendrite and the cellulose are dissolved in the reaction solution. Formation of the silver nano dendrite 10 and the cellulose depending on the molar concentration of the reaction solution and a time in which the reaction metal is soaked in the reaction solution will be described in detail below.

In addition, the method of manufacturing a cellulose thin film electrode comprising a silver nano dendrite according to the present exemplary embodiment may further comprise cleaning the cellulose thin film electrode with ion-exchanged water (S300).

In addition, the method of manufacturing a cellulose thin film electrode comprising a silver nano dendrite according to the present exemplary embodiment may further comprise, after the cleaning of the cellulose thin film electrode with the ion-exchanged water, shaking the cellulose thin film electrode at a predetermined time interval to dry the cellulose thin film electrode (S400).

Hereinafter, the method of manufacturing a cellulose thin film electrode comprising a silver nano dendrite according to the present exemplary embodiment will be described in detail.

Inventive Example 1

1. Preparation of Thin Film

First, 5 wt % or more of cellulose acetate comprising 3.0 wt % of silver nitrate is applied to aluminum foil using dimethylformamide.

Characteristics of a cellulose thin film electrode may be changed depending on a weight ratio of the cellulose acetate, and will be described below.

Then, the aluminum foil as a cast film to which the silver nitrate and the cellulose acetate (AgND/CA) are applied is stored at 25° C. for two hours, and is then dried in a vacuum state for twenty-four hours.

In addition, the silver nitrate may be a precursor that becomes a silver nano dendrite.

In addition, the thin film may further comprise a multi-wall carbon nanotube (MWCNT).

Here, the MWCNT may improve electrolyte accessibility to improve a capacitance value.

Here, the improvement of the capacitance value of the cellulose thin film electrode comprising the MWCNT will be described in detail below.

2. Reaction Process (1) Cast Film Reaction

The aluminum foil to which the dried thin film is attached is soaked in a sodium hydroxide (NaOH) aqueous solution.

The aluminum foil to which the thin film is attached is soaked in the sodium hydroxide (NaOH) aqueous solution for a predetermined time to form a cellulose thin film electrode comprising a silver nano dendrite. Then, the cellulose thin film electrode is separated from the aluminum foil to be thus removed from the sodium hydroxide (NaOH) aqueous solution.

Here, the aluminum foil to which the thin film is attached may be soaked in the sodium hydroxide (NaOH) aqueous solution at a molar concentration of 0.05M for three minutes.

Here, a galvanic substitution reaction may be generated between the silver nitrate and aluminum.

In detail, a galvanic substitution reaction in which a silver ion comprised in the silver nitrate acts as an oxidizing agent and the aluminum acts as a reducing agent may be generated. That is, the silver nitrate and the aluminum are exposed to the sodium hydroxide aqueous solution, such that the aluminum may lose an electron to become an aluminum ion and a silver ion comprised in a silver nitrate solution may obtain an electron to form the silver nano dendrite 10.

In addition, the cellulose acetate may become the cellulose by a hydrolysis hydrogenation reaction.

In detail, when the aluminum foil to which the cellulose acetate is applied is soaked in the sodium hydroxide (NaOH) aqueous solution, the sodium hydroxide (NaOH) aqueous solution and the aluminum foil react to each other, such that hydrogen is generated.

The hydrogen generated as described above generates hydrolysis hydrogenation in the cellulose acetate, such that acetate may be decomposed from the cellulose.

Therefore, according to the present exemplary embodiment, the cellulose thin film electrode comprising a silver nano dendrite 10 may be formed by the aluminum foil soaked in the alkaline solution.

Here, according to the present exemplary embodiment, it could be seen that when the reaction metal comprising the aluminum foil is soaked in the reaction solution comprising the sodium hydroxide (NaOH) having a molar concentration of 0.01M to 1M for 0.5 to 5 minutes, the silver nitrate is substituted by the silver nano dendrite 10 and the cellulose acetate is decomposed into the cellulose.

In addition, it could be seen that when the reaction metal comprising the aluminum foil is soaked in the reaction solution comprising the sodium hydroxide (NaOH) having a molar concentration of 1M or more for 5 to 10 minutes, the silver nitrate is substituted by the silver nano dendrite 10 and the cellulose acetate is decomposed into the cellulose.

However, it could be seen that when the reaction metal comprising the aluminum foil is soaked in the reaction solution comprising the sodium hydroxide (NaOH) having a molar concentration less than 0.01M, the silver nano dendrite 10 and the cellulose are hardly formed. The reason is that in the case in which the molar concentration of the reaction solution is less than 0.01M, a galvanic reaction rate between the silver nitrate and the reaction metal is low and a hydrolysis reaction rate of the cellulose acetate is low.

In addition, it could be seen that when the reaction metal comprising the aluminum foil is soaked in the reaction solution comprising the sodium hydroxide (NaOH) having a molar concentration exceeding 1M, the silver nano dendrite 10 and the cellulose are hardly formed. The reason is that in the case in which the molar concentration of the reaction solution exceeds 1M, a galvanic reaction rate between the silver nitrate and the reaction metal is excessively high and a hydrolysis reaction rate of the cellulose acetate is excessively high, such that the silver nano dendrite 10 and the cellulose are decomposed.

Here, the reaction solution according to the present exemplary embodiment is not limited to the sodium hydroxide (NaOH) solution, but may comprise an alkaline solution comprising sodium hydroxide (NaOH), potassium hydroxide (KOH), and ammonium hydroxide ($NH_4OH$) and an acid solution comprising hydrochloric acid (HCl), sulfuric acid ($H_2SO_4$), and nitric acid ($HNO_3$).

In addition, the reaction metal according to the present exemplary embodiment is not limited to the aluminum, but may comprise magnesium (Mg), zinc (Zn), chromium (Cr), copper (Cu), tin (Sn), iron (Fe), and an alloy of two or more of the aluminum (Al), the magnesium (Mg), the zinc (Zn), the chromium (Cr), the copper (Cu), the tin (Sn), and the iron (Fe).

(2) Processing of Cellulose Thin Film Electrode

The cellulose thin film electrode is cleaned with ion-exchanged water, and is then shaken twice or more at an interval of one hour to be thus dried.

In addition, the cellulose thin film electrode is dried in a vacuum state at 25° C. for twenty-four hours, and reacts to the sodium hydroxide (NaOH) solution having a molar concentration of 0.05M.

(4) Experimental Example of Cellulose Thin Film Electrode

Figure 2:
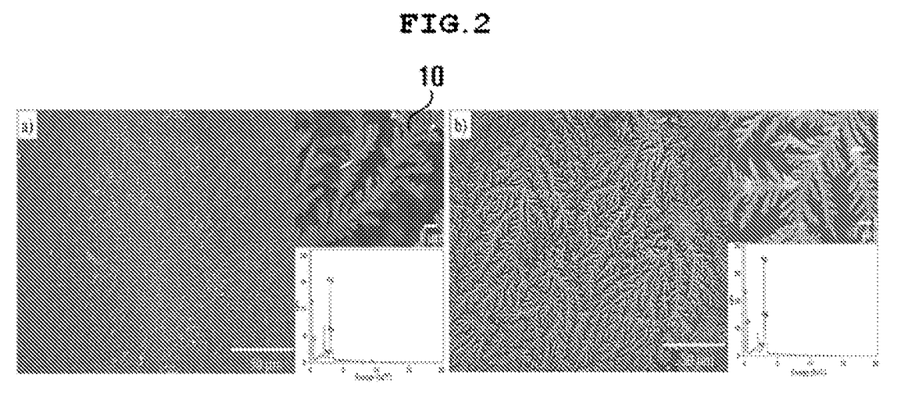
FIGS. 2A and 2B are images of the cellulose thin film electrode comprising a silver nano dendrite according to an exemplary embodiment of the present disclosure captured by a scanning electron microscope (SEM).
Figure 3:
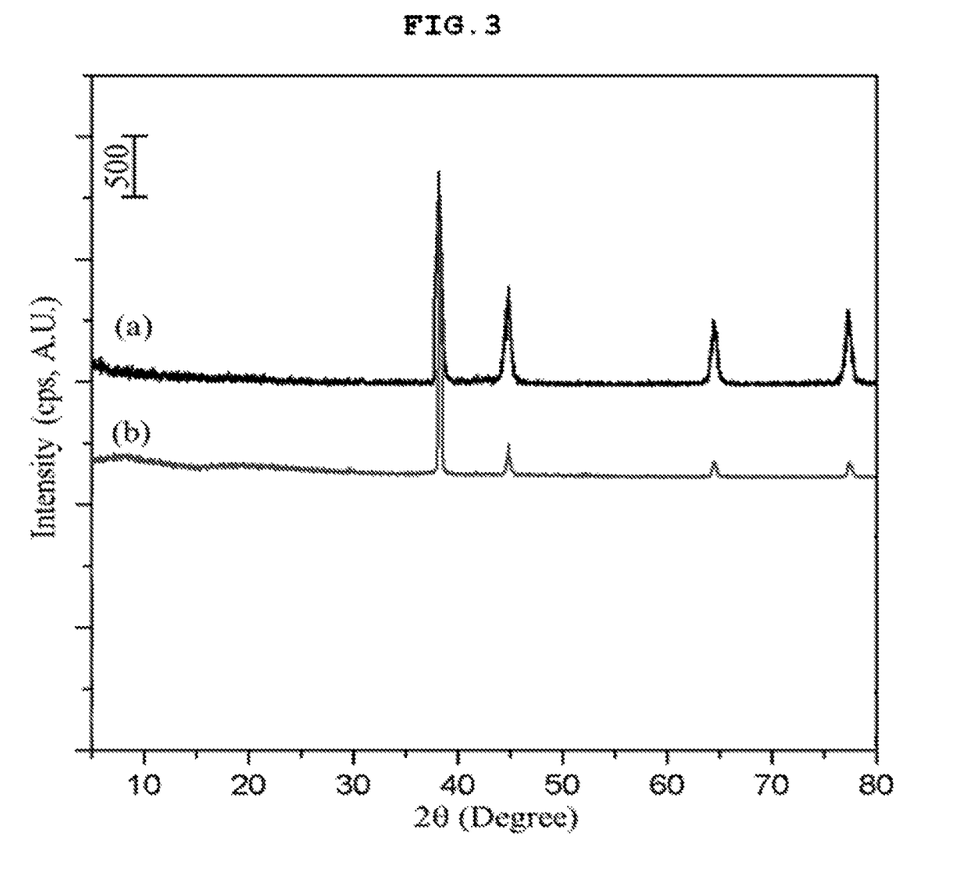
FIGS. 3A and 3B are graphs illustrating a comparison result of an X-ray diffraction pattern (XRD pattern) of the cellulose thin film electrode comprising a silver nano dendrite according to an exemplary embodiment of the present disclosure.

FIGS. 2A and 2B are images of the cellulose thin film electrode comprising a silver nano dendrite according to an exemplary embodiment of the present disclosure captured by a scanning electron microscope (SEM), and FIGS. 3A and 3B are graphs illustrating a comparison result of an X-ray diffraction pattern (XRD pattern) of the cellulose thin film electrode comprising a silver nano dendrite according to an exemplary embodiment of the present disclosure.

In detail, FIGS. 2A and 3A are, respectively, an image and a graph illustrating characteristics of a front side of the cellulose thin film electrode (hereinafter, referred to as a thin film electrode) comprising a silver nano dendrite, and FIGS. 2B and 3B are, respectively, an image and a graph illustrating characteristics of a back side of the thin film electrode.

Here, the front side of the thin film electrode means an opposite side to one side of the thin film electrode adhered to the aluminum foil, and the back side of the thin film electrode means one side of the thin film electrode adhered to the aluminum foil.

Referring to FIGS. 2A to 3B, it may be seen that energy dispersive spectrometers (EDSs) are generated on the front side and the back side of the thin film electrode.

Here, the silver nano dendrites are formed on the front side and the back side of the thin film electrode by a galvanic substitution reaction, such that each of the front side and the back side of the thin film electrode may exhibit electrical characteristics.

That is, it may be seen that the front side and the back side of the thin film electrode according to the present exemplary embodiment exhibit the electrical characteristics and may be used as a double-sided electrode.

In addition, it may be confirmed that a diffraction angle of the thin film electrode is 4.76° and a peak value of an X-ray diffraction angle appears at 38.13°. Therefore, it may be seen that the thin film electrode is formed in a face-centered cubic (fcc) structure.

Here, the face-centered cubic structure is a crystal structure in which particles are arranged to be disposed at the centers of the respective faces of a cube. In addition, a metal having the face-centered cubic structure is not destroyed even though it is bent.

Therefore, the thin film electrode is formed in the face-centered cubic structure, such that flexible characteristics of the thin film electrode may be maintained.

Figure 4:
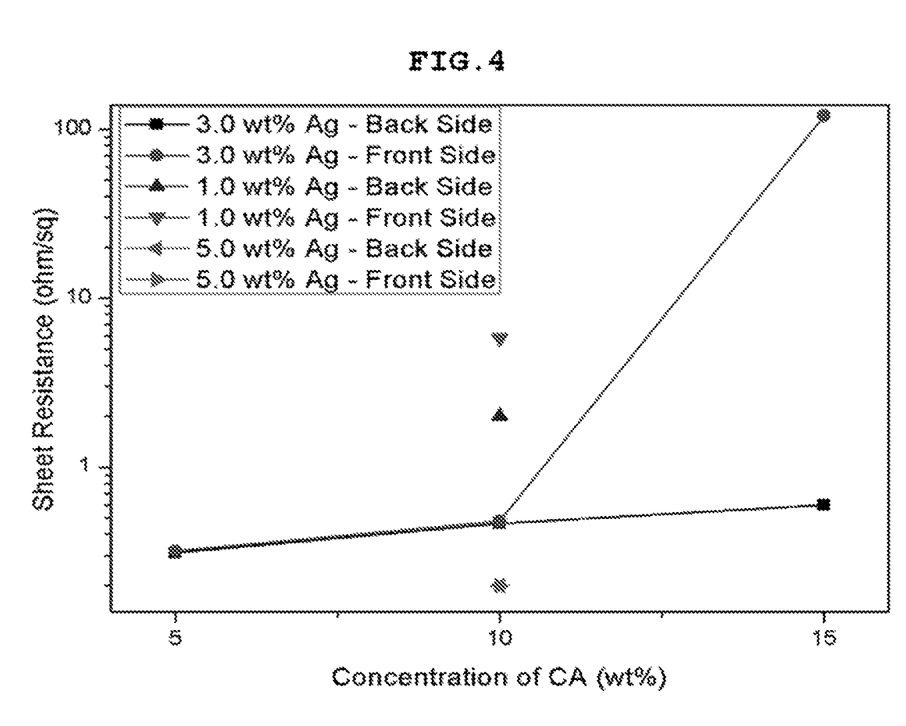
FIG. 4 is a graph illustrating a resistance of the cellulose thin film electrode depending on a mass ratio between silver and cellulose acetate in the cellulose thin film electrode comprising a silver nano dendrite according to an exemplary embodiment of the present disclosure.

FIG. 4 is a graph illustrating a resistance of the cellulose thin film electrode depending on a mass ratio between silver and cellulose acetate in the cellulose thin film electrode comprising a silver nano dendrite according to an exemplary embodiment of the present disclosure.

Referring to FIG. 4, a resistance of a front side of a thin film electrode comprising 5.0 wt % of cellulose acetate is 0.32 ohm/sq and a resistance of a back side of the thin film electrode is 0.31 ohm/sq.

In addition, a resistance of a front side of a thin film electrode comprising 10.0 wt % of cellulose acetate is 0.47 ohm/sq and a resistance of a back side of the thin film electrode is 0.45 ohm/sq, and a resistance of a front side of a thin film electrode comprising 15.0 wt % of cellulose acetate is 118 ohm/sq and a resistance of a back side of the thin film electrode is 0.62 ohm/sq.

Here, the reason why a resistance value of the thin film electrode is changed depending on an amount of cellulose acetate is that an insulating effect due to an increase in the amount of the cellulose acetate is generated.

That is, electrical characteristics of the thin film electrode may be adjusted depending on a mass ratio of the cellulose acetate.

In addition, the thin film electrode according to the present exemplary embodiment may be utilized as a flexible double-sided electrode using electrical characteristics appearing on both sides of the thin film electrode.

Figure 5:
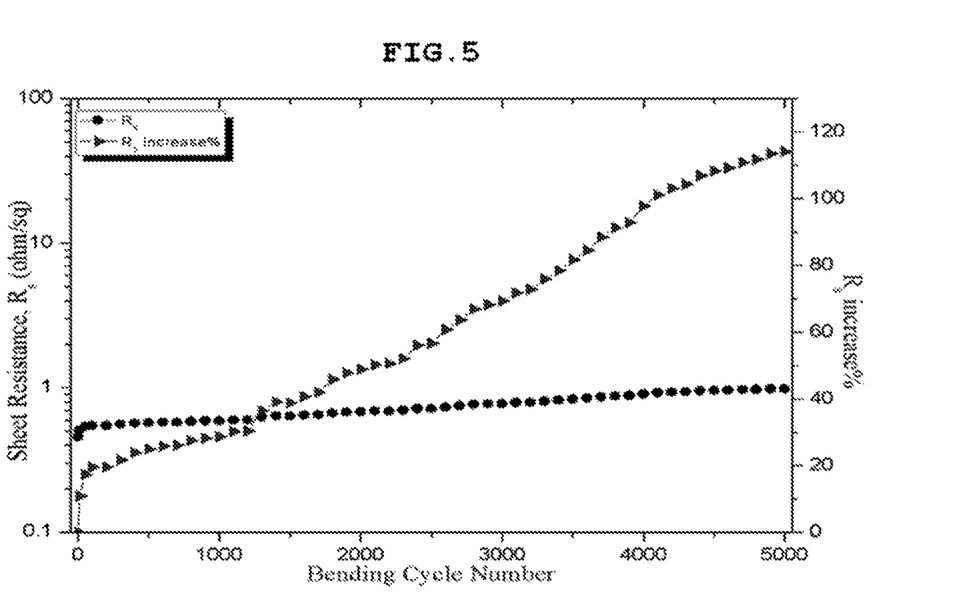
FIG. 5 is a graph illustrating a change in a resistance value per unit area depending on a bending cycle number of the cellulose thin film electrode comprising a silver nano dendrite according to an exemplary embodiment of the present disclosure.

FIG. 5 is a graph illustrating a change in a resistance value per unit area depending on a bending cycle number of the cellulose thin film electrode comprising a silver nano dendrite according to an exemplary embodiment of the present disclosure.

Referring to FIG. 5, in a bending experiment of the thin film electrode, both ends of the thin film electrode are fixed by a clamp, and the thin film electrode is repeatedly bent at a bending angle of 55 to 60° and in a radius of about 5 mm and unbent.

Here, after the thin film electrode is basically bent one hundred times, a resistance value and a resistance change of the thin film electrode were measured.

It may be seen that after the thin film electrode is first bent one hundred times, the resistance value of the thin film electrode is rapidly increased from 0.46 ohm/sq to 0.55 ohm/sq.

In addition, after the thin film electrode is repeatedly bent five thousand times, the resistance value of the thin film electrode was increased 0.99 ohm/sq.

That is, it may be seen that the thin film electrode has a resistance of 1 ohm/sq or less when it is bent five thousand times or less.

Therefore, it may be seen that the cellulose thin film electrode comprising a silver nano dendrite according to the present exemplary embodiment has toughness that it is not destroyed by repetitive external force and maintains a resistance of a predetermined value or less.

FIGS. 6A to 6D are images of a cellulose thin film electrode comprising a silver nano dendrite, comprising a multi-wall carbon nanotube according to another exemplary embodiment of the present disclosure captured by an SEM. In addition, FIG. 7A is a graph illustrating a cyclic voltammogram (CV) of the cellulose thin film electrode of FIGS. 6A to 6D, FIG. 7B is a graph illustrating a voltage change depending on a time change of the cellulose thin film electrode of FIGS. 6A to 6D, and FIG. 8 is a graph illustrating a capacitance value and a capacitance maintaining ratio of the cellulose thin film electrode of FIGS. 6A to 6D.

Figure 6:
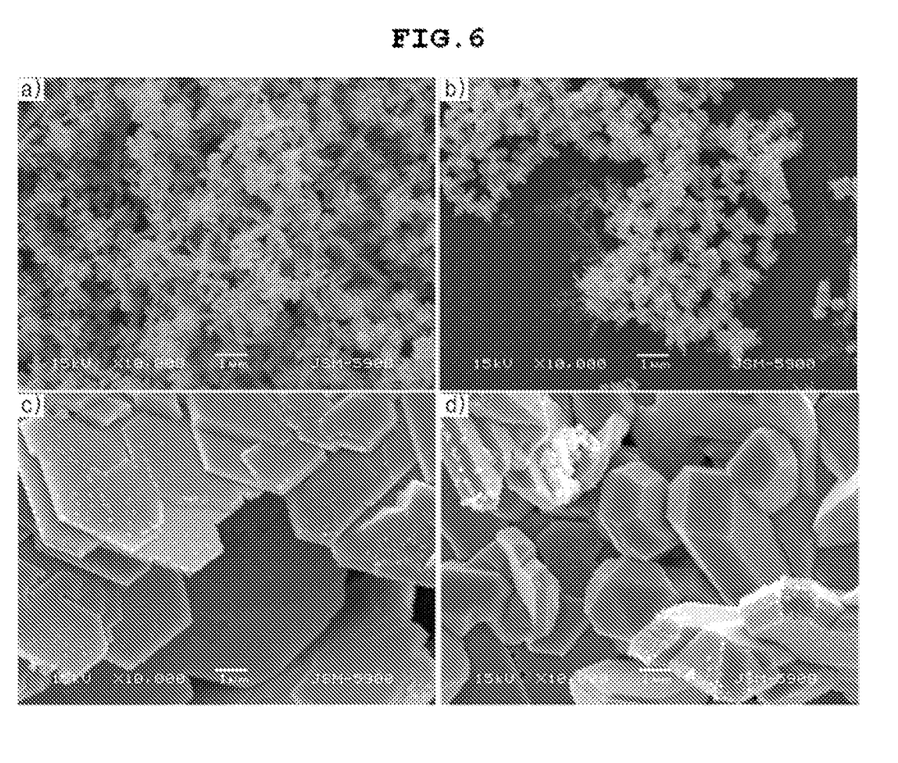
FIGS. 6A to 6D are images of a cellulose thin film electrode comprising a silver nano dendrite, comprising a multi-wall carbon nanotube (MWCNT) according to another exemplary embodiment of the present disclosure captured by an SEM.
Figure 7:
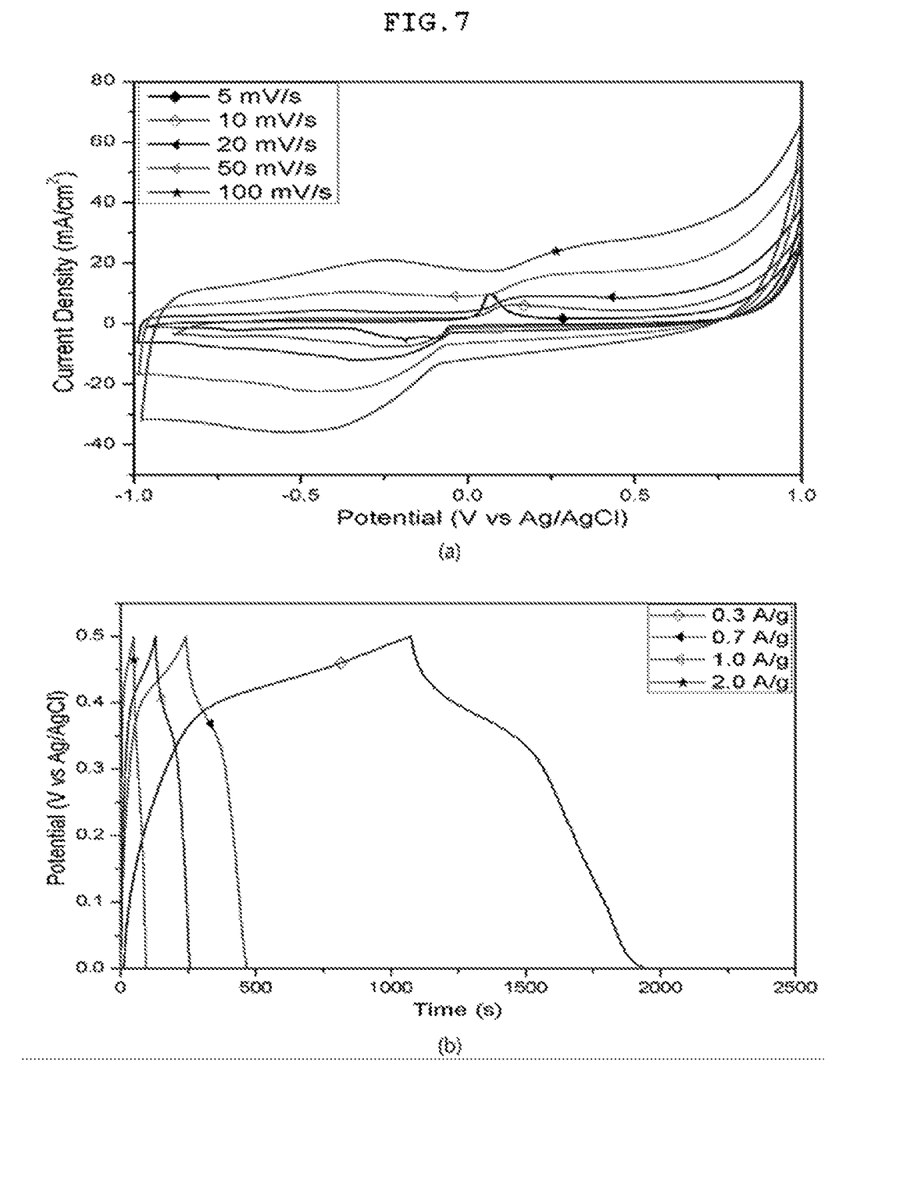
FIG. 7A is a graph illustrating a cyclic voltammogram (CV) of the cellulose thin film electrode of FIGS. 6A to 6D.
FIG. 7B is a graph illustrating a voltage change depending on a time change of the cellulose thin film electrode of FIGS. 6A to 6D.
Figure 8:
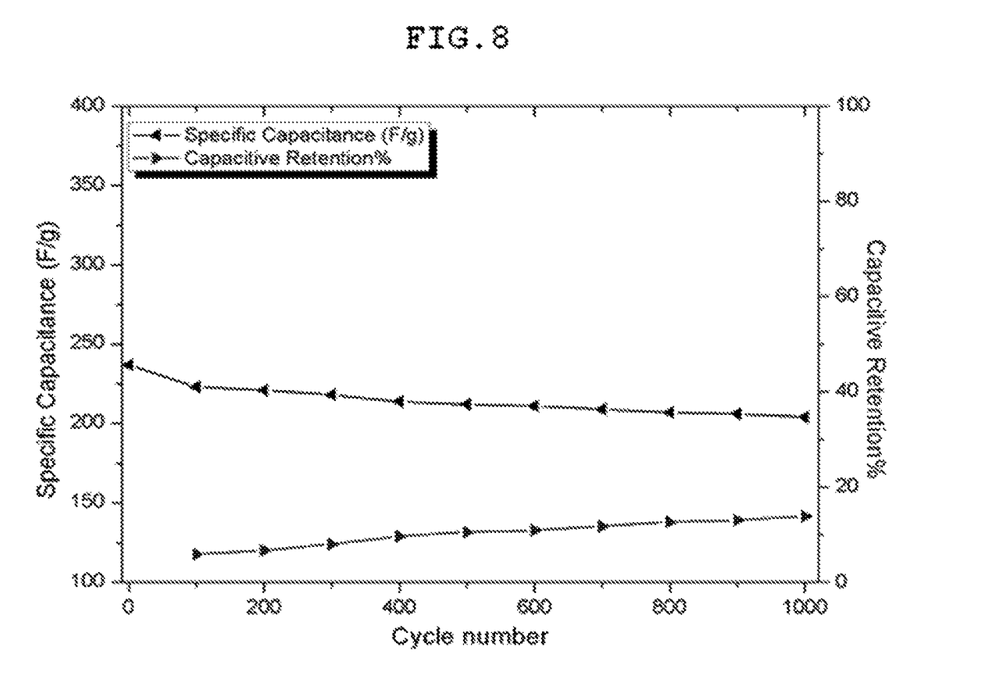
FIG. 8 is a graph illustrating a capacitance value and a capacitance maintaining ratio of the cellulose thin film electrode of FIGS. 6A to 6D.

Referring to FIGS. 6 to 8, electrical characteristics of the thin film electrode comprising the MWCNT are illustrated.

A cyclic voltammogram (CV) curve of the thin film electrode comprising the MWCNT has a rectangular shape, and is a graph of a typical capacitive element.

That is, it means that the thin film electrode comprising the MWCNT according to the present exemplary embodiment may serve as a supercapacitor electrode.

In addition, the thin film electrode comprising the MWCNT showed a decrease in a capacity by about 14% after 1000 cycles.

That is, the thin film electrode comprising the MWCNT according to the present exemplary embodiment may maintain a predetermined capacity even after 1000 cycles and may be utilized as a supercapacitor.

According to an aspect of the present disclosure, the method of manufacturing a cellulose thin film electrode comprising a silver nano dendrite capable of easily manufacturing the cellulose thin film electrode and the cellulose thin film electrode manufactured by the method of manufacturing a cellulose thin film electrode comprising a silver nano dendrite may be provided.

Although the exemplary embodiments of the present disclosure have been described hereinabove, the present disclosure is not limited thereto, but may be variously modified without departing from the scope of the claims, the detailed description, and the accompanying drawings, and these modifications should be understood to fall within the scope of the present disclosure.

What is claimed is:

1. A method of manufacturing a cellulose thin film electrode comprising a silver nano dendrite, comprising:
   forming the cellulose thin film electrode comprising a silver nano dendrite by soaking a reaction metal in a reaction solution, wherein a thin film comprising silver nitrate and cellulose acetate is attached to the reaction metal; and
   separating the cellulose thin film electrode from the reaction metal and then removing the reaction metal from the reaction solution.

2. The method of manufacturing a cellulose thin film electrode comprising a silver nano dendrite of claim 1, wherein the thin film further comprises a multi-wall carbon nanotube (MWCNT).

3. The method of manufacturing a cellulose thin film electrode comprising a silver nano dendrite of claim 1, wherein the reaction solution comprises an acid solution and an alkaline solution, a molar concentration of the acid solution or the alkaline solution is 0.01M or more, and the reaction metal is soaked in the reaction solution for 0.5 to 10 minutes.

4. The method of manufacturing a cellulose thin film electrode comprising a silver nano dendrite of claim 3, wherein the reaction metal is soaked in the reaction solution for 0.5 to 5 minutes when the molar concentration of the reaction solution is 0.01M to 1.0M.

5. The method of manufacturing a cellulose thin film electrode comprising a silver nano dendrite of claim 3, wherein the reaction metal is soaked in the reaction solution for 5 to 10 minutes when the molar concentration of the reaction solution is 1.0M or more.

6. The method of manufacturing a cellulose thin film electrode comprising a silver nano dendrite of claim 3, wherein the acid solution comprises hydrochloric acid (HCl), sulfuric acid ($H_2SO_4$), and nitric acid ($HNO_3$), the alkaline solution comprises sodium hydroxide (NaOH), potassium hydroxide (KOH), and ammonium hydroxide ($NH_4OH$), and the reaction metal comprises aluminum (Al), magnesium (Mg), zinc (Zn), chromium (Cr), copper (Cu), tin (Sn), iron (Fe), and an alloy of two or more of the aluminum (Al), the magnesium (Mg), the zinc (Zn), the chromium (Cr), the copper (Cu), the tin (Sn), and the iron (Fe).

7. A cellulose thin film electrode comprising a silver nano dendrite manufactured by the method of manufacturing a cellulose thin film electrode comprising a silver nano dendrite of claim 1.

* * * * *